US005476008A

United States Patent [19]

Pinson

[11] Patent Number: 5,476,008
[45] Date of Patent: Dec. 19, 1995

[54] RATE-SENSING TUNING FORK DESIGN

[75] Inventor: John C. Pinson, Anaheim, Calif.

[73] Assignee: Rockwell International Corporation, Seal Beach, Calif.

[21] Appl. No.: 279,722

[22] Filed: Jul. 25, 1994

[51] Int. Cl.$^6$ ...................................................... G01P 9/04
[52] U.S. Cl. ........................................ 73/504.16; 310/367
[58] Field of Search ................................ 73/505; 310/321, 310/323, 326, 327, 329, 330, 370, 367

[56]  References Cited

U.S. PATENT DOCUMENTS

| Re. 32,931 | 5/1989 | Staudte | 73/505 |
|---|---|---|---|
| 4,898,032 | 2/1990 | Voles | 73/505 |
| 4,899,587 | 2/1990 | Staudte | 73/505 |
| 5,056,366 | 10/1991 | Fersht et al. | 73/505 |

Primary Examiner—Hezron E. Williams
Assistant Examiner—Richard A. Moller
Attorney, Agent, or Firm—George A. Montanye; David J. Arthur; Susie H. Oh

[57]  ABSTRACT

An improvement in rate-sensing tuning fork design includes a generally planar and H-shaped sensor frame of piezoelectric material. The frame includes a first pair of tines and a second pair of tines joined to an intermediate cross-piece. Connecting means is provided for connecting each of the second pair of tines to the other of said second pair at a location spaced from said intermediate cross-piece. The connecting means is preferably a connecting member formed of piezoelectric material, with the member being generally parallel to the intermediate cross-piece of the H-shaped frame and disposed between the second pair of tines. The connecting means prevents each of the tines of the second pair from vibrating directly toward or away from each other. A preferred method of use of the device is described.

8 Claims, 2 Drawing Sheets

RATE-SENSING TUNING FORK DESIGN

BACKGROUND OF THE INVENTION

This invention relates to angular rate-sensing devices, and specifically to an improved tuning fork design useful in such devices.

It is known to provide angular rate-sensing devices incorporating a double tuning fork configuration, one fork having a pair of driven tines and the other fork having a pair of tines for sensing angular rate.

Devices of this type can be provided in either an "open-loop" or a "closed-loop" arrangement. The present invention is useful in either arrangement, and improves the performance of such devices by modifying the frequency of the "pickoff drive mode".

Examples of prior art open-loop devices are illustrated and described in broad terms in U.S. Pat. Nos. 4,524,619 (U.S. Pat. No. Re. 32,931) and 4,899,587 to Staudte and U.S. Pat. No. 4,898,032 to Voles (at FIG. 1a therein and the associated specification). For ease of reference, a copy of Voles FIG. 1a is included herein as FIG. 1a.

An example of a closed-loop prior art design is illustrated in FIG. 1b, which is copied from FIG. 1 of U.S. Pat. No. 5,056,366 to Fersht et al.

Prior art tuning fork devices such as those shown in FIGS. 1a and 1b include many basic features that are preferably also present in the instant invention.

For example, in FIG. 1a, a wafer 11 of piezoelectric material forms a mounting frame for the tuning fork structure. The tuning forks formed by pairs of tines 14, 15 and 16, 17 are interconnected by a stem or base 18, which is in turn connected to the frame 11 by bridges 12 and 13. The "driven" tines 16 and 17 are energized by electrodes operatively attached thereto, and are thereby caused to vibrate in the "x" direction of FIG. 1a, at their natural resonant frequency ("NRF"). Electrodes are also mounted on the "sensing" or "pickoff" tines 14 and 15 to derive the output signal.

When, for example, the structure of FIG. 1a is rotated about the y-axis (while driven tines 16 and 17 are being vibrated in the x-axis direction), Coriolis forces cause torque to pass through the stem 18, causing tines 14 and 15 to vibrate in the direction of the z-axis, which vibration then forms the basis of the output signal.

Additionally similar to the present invention, the structure of FIG. 1a may be chemically etched, machined by laser beam or ultrasonic methods, or similar expedients well known in the semiconductor art.

For several reasons (known to persons of ordinary skill in the art), it is desirable and advantageous to tune the sensing fork NRF to near the NRF of the driven fork. see, for example, U.S. Pat. No. 5,056,366 to Fersht et al., at col. 2, l. 2–12. In an open-loop system, the difference in these frequencies is greater than the bandwidth. Typical design requirements for such double tuning fork configurations "open-loop systems" place the "drive" and the "pickoff" mode NRFs near each other at about 10 KHz.

In closed-loop systems, the difference in these frequencies can be less than the bandwidth, and can even be zero. Those skilled in the art will understand that, in closed-loop systems such as Fersht, additional control electrodes are used to "null" the Coriolis-induced out-of-plane vibration of the tines. Through a closed-loop feedback system, the Coriolis forces experienced by the driven tines is measured and utilized to determine the rate of rotation about the y-axis of the sensor.

Thus, in both open- and closed-loop systems the NRFs of the drive mode and the pickoff mode are near to each other.

In devices of this type, it is also desirable to locate the double tuning fork free-body motion nodes of the pickoff mode and the drive mode at the points at which the tuning fork structure is attached to the frame. In FIG. 1a, for example, these attachment points are bridges 12 and 13, although those skilled in the art will understand that the device of FIG. 1a does not locate the relevant nodes at those attachment points because of the lack of symmetry of the fork structure.

By locating these nodes at those attachment points, the forks can be better isolated from external stresses, twists, and similar forces on the frame 11 that might otherwise interfere with the desired measurements of the tuning fork device.

In other words, the risk of errors from such external stresses and vibrations can be minimized by placing the node of pickoff mode motion along the longitudinal axis of a connecting bridge, such as bridges 12 and 13 (FIG. 1a). One way to accomplish this node placement is to make the tuning forks "mirror images" of each other.

The need for the present invention arises, however, because of additional design requirements for these devices. Among other things, in order for the output signals to be readily ascertainable, all other normal mode NRFs (other than the drive and pickoff modes) must typically be separated from the normal drive NRF by at least 2 KHz. One such "other" mode which can be especially troublesome in this regard is the normal "pickoff drive mode" (the mode in which the pickoff tines vibrate directly toward and away from each other).

In the aforementioned "mirror-image" configuration, the "sensing" fork has a "pickoff drive mode" with a NRF that is identical or very near the "actual" drive mode NRF. Thus, although the "mirror-image" configuration achieves the desired isolation of the tuning forks from external forces, it also violates the aforementioned 2 KHz separation rule and renders the device unsuitable for its intended sensing purpose. On the other hand, the desired 2 KHz separation can be achieved by altering the configuration and/or dimensions of one of the forks (so that they are not "mirror-images" of each other; see FIG. 1c, for example), but then the connecting bridge structure is not the motion node (that is, the motion node is offset from the axis of the connecting bridge), and external stresses and undesired vibrations from the mounting wafer frame 11 can alter the pickoff mode, causing errors in the output signal.

Those skilled in the art will understand that, in certain prior art designs, complicated structures are incorporated into the frame 11 (FIG. 1a) to try to isolate the sensor from such external stresses and undesired vibrations. Prior art designs, however, have been unable to simultaneously accomplish both of the foregoing objectives: to place the node of pickoff mode motion along the longitudinal axis of the connecting bridge, such as bridges 12 and 13 (FIG. 1a); and to meet the foregoing 2 KHz separation criteria for the "pickoff drive mode".

OBJECTS AND ADVANTAGES OF THE INVENTION

It is, therefore, an object of my invention to provide an improved angular rate-sensing device, which provides the numerous benefits of the double tuning fork configuration with less risk of the aforementioned errors in output caused by "external" strains such as those from the instrument case or supporting frame, while at the same time "moving" the pickoff drive mode sufficiently away from the NRFs of the drive and pickoff modes.

Another object of my invention is the provision of a sensor comprising a generally planar and H-shaped sensor frame of piezoelectric material, the frame including a first pair of tines and a second pair of tines joined to an intermediate cross-piece, which further includes connecting means for connecting each of the second pair of tines to the other of the pair at a location spaced from the intermediate cross-piece. Such a connecting means eliminates the above-described "pickoff drive mode" problem, and has only slight effects on the useful drive and pickoff modes.

A further object of my invention is the provision of a sensor of the aforementioned character, in which the connecting means is constituted by a connecting member of piezoelectric material that is generally parallel to the intermediate cross-piece of the H-shaped frame. In the preferred embodiment, this connecting member is fabricated from the same wafer from which the frame and tuning forks are etched, etc., permitting the device to be produced relatively economically.

Still another object of my invention is the provision of a sensor of the aforementioned character, in which the connecting means is disposed between the second pair of tines to prevent each of the tines comprising the second pair of tines from vibrating directly toward or away from each other. As indicated above, this is the direction of the above-described "pickoff drive mode" problem vibration, and placing the connecting means directly between the relevant tines prevents them from vibrating in that direction.

Yet another object of my invention is the provision of a rotation rate sensor of the type that includes a generally planar and H-shaped sensor frame of piezoelectric material, the frame including a first pair of tines and a second pair of tines collectively forming the legs of the H-shape, the tines being joined to an intermediate cross-piece and further including a first array of drive electrodes fixed to the first tines for transmitting electrical signals for driving the first tines in-plane and a second array of pickoff electrodes fixed to the second tines for transmitting electrical signals generated in the second tines in response to Coriolis-induced out-of-plane bending thereof, and further including connecting means for connecting each of the second pair of tines to the other of the second pair at a location spaced from the intermediate cross-piece.

As described above, the connecting means moves the above-described "pickoff drive mode" away from the pickoff mode and the drive mode, and has only slight effects on the useful drive and pickoff modes. Those skilled in the art will understand that other modes must be considered as well, but my invention provides greater flexibility in these other design choices than do prior art tuning fork sensors.

An additional object of my invention is the provision of a rotation rate sensor comprising a first pair of tines and a second pair of tines, the tines being joined to an intermediate cross-piece, the pairs of tines and the cross-piece being of piezoelectric material, and connecting means for connecting each of the second pair of tines to the other of the pair at a location spaced from the intermediate cross-piece.

A further object of my invention is the provision of a method of sensing rotation using a device of the aforementioned character.

Another object of my invention is the provision of an angular rate sensor in a dual tuning fork configuration of piezoelectric material, with each of the tuning forks having a pair of tines and a base portion and the tuning forks being interconnected at the base portions. Among other things, the invention includes attachment means for attaching the tines of one of the pairs of tines to each other at a location remote from the interconnected bases. The tuning forks are preferably disposed in oppositely extending directions from the interconnected base portions along a first axis, and the tines of each of the pairs of tines are spaced relatively to each other along a second axis perpendicular to the first axis, and the attachment means prevents the tines of one of the pairs of tines from moving relative to each other along the second axis.

Other objects and advantages of the invention will be apparent from the following specification and the accompanying drawings, which are for the purpose of illustration only.

DESCRIPTION OF PREFERRED EMBODIMENT

Figure 2:
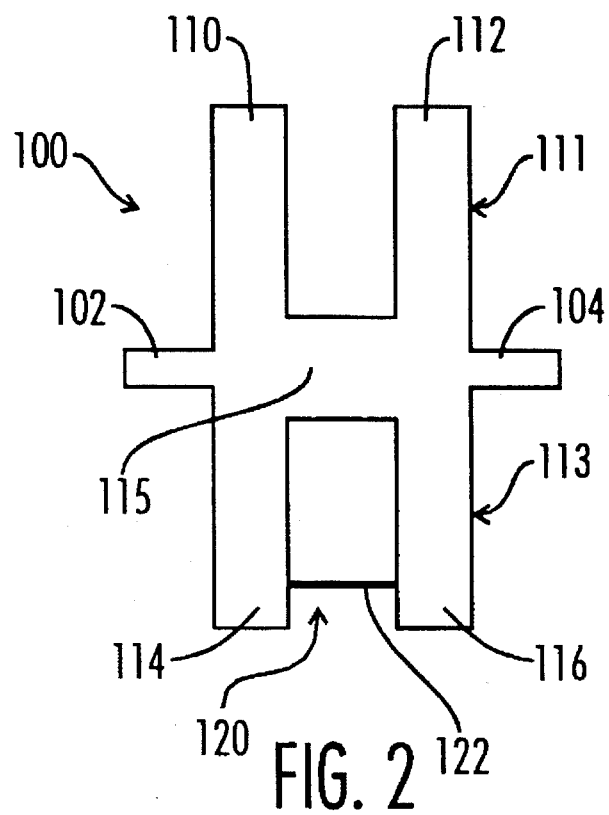
FIG. 2 is a top-view illustration of a double tuning fork configuration in accordance with the teachings of the invention.

Referring to the drawings, and particularly to FIG. 2, I illustrate a preferred embodiment of a rate-sensing tuning fork 100 constructed in accordance with the teachings of the present invention.

Figure 1A:
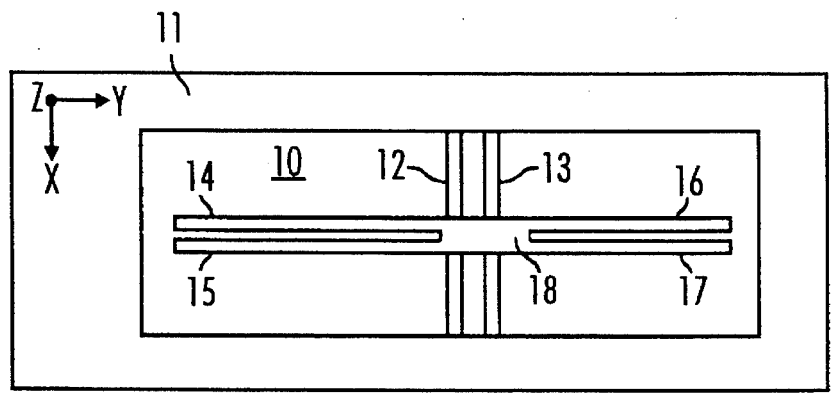
FIG. 1a illustrates a known angular rate sensor described in U.S. Pat. No. 4,524,619 to Staudte.
Figure 1B:
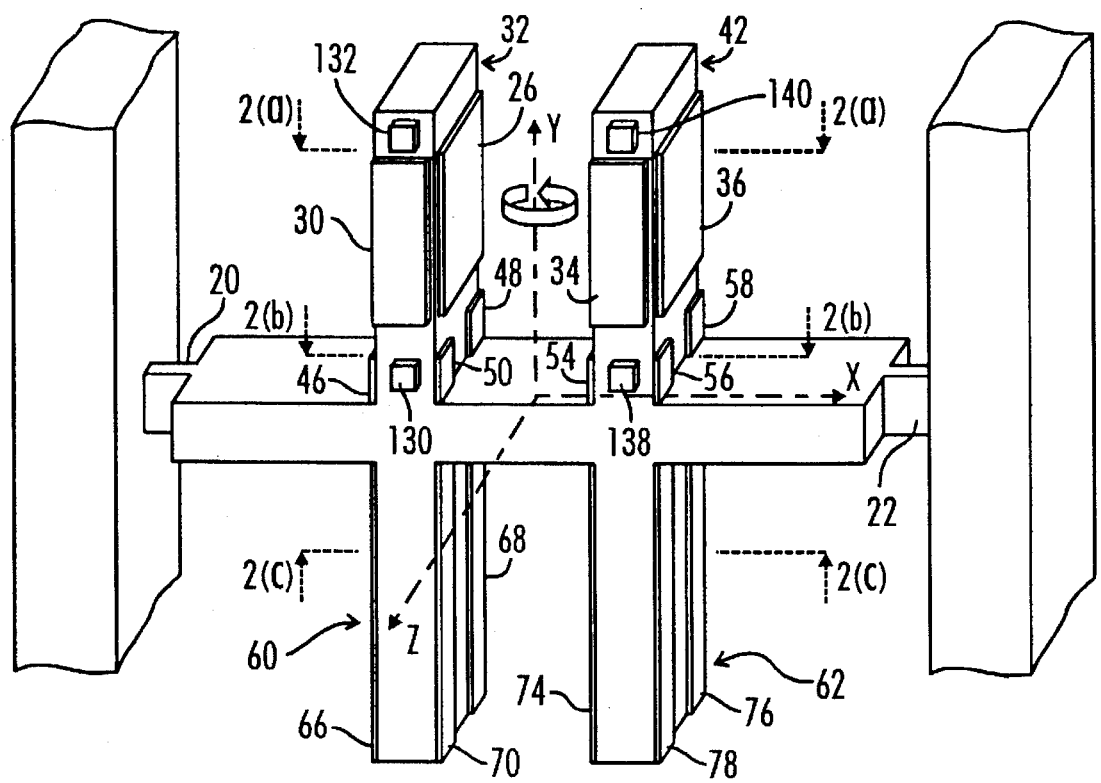
FIG. 1b illustrates another known angular rate sensor described in U.S. Pat. No. 5,056,366 to Fersht et al.
Figure 1C:
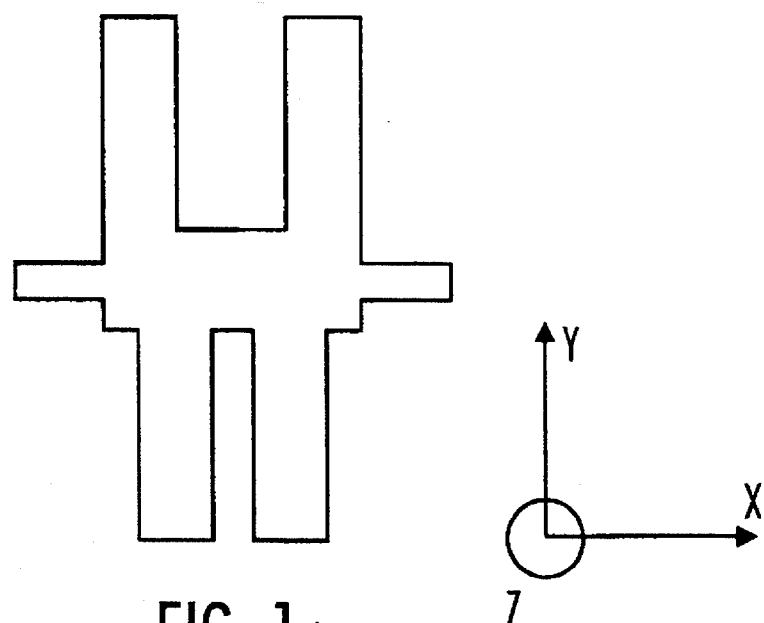
FIG. 1c illustrates yet another prior art configuration for an angular rate-sensing devices incorporating a double tuning fork configuration.

As indicated above, the present invention shares many of the features (including various broad structural elements and functions, as well as fabrication techniques) of the prior art devices shown in FIGS. 1a and 1b. Those skilled in the art will understand that these general techniques and operational principles apply to, and are utilized in, the present invention. For example, the bridge members 102 and 104 of the sensing device 100, FIG. 2, are operatively attached to a supporting frame (not shown) such as frame 11 of FIG. 1a. The present sensor 100 further utilizes driving and sensing electrodes (not shown) similar to those described in U.S. Pat. No. 4,524,619 to Staudte.

There are, however, important differences between such prior art tuning forks and the present invention. Among other things, the present sensing device 100, FIG. 2, provides a driven tuning fork 111 having a first pair of tines 110 and 112 and a "mirror-image" sensing tuning fork 113 having a second pair of tines 114 and 116, all operatively connected by an intermediate cross-piece 115. The present invention eliminates the undesirable and disabling "pickoff drive mode" vibration that can otherwise occur in such mirror-image arrangements, by providing connecting means 120 such as a connecting member 122 for connecting each of the second pair of tines 114 and 116 to the other of said pair. In order to provide the desired function, the connecting means 120 is spaced from the intermediate cross-piece 115.

In the preferred embodiment, connecting means 120 is constituted by a connecting member 122 of piezoelectric material that is generally parallel to the intermediate cross-piece 115 of the H-shaped frame formed by the cross-piece 115 and the tines 110, 112, 114 and 116. An economical manner of manufacturing the device 100 and its connecting member 122 is to form the member 122 from the same wafer of which, and during the etching process by which, the rest of the H-shaped structure is fabricated.

Moreover, in the preferred embodiment of the sensor 100, the attachment means or connecting means 120 is disposed between the second pair of tines 114 and 116 to prevent each of those tines from vibrating directly toward or away from each other. For convenience, this direction is commonly denominated as the x-axis, while the longitudinal axis of the tines is denominated the y-axis, and the third orthogonal axis is labelled the z-axis.

Those skilled in the art will understand that the precise dimensions and shape of the connecting means 120 and its location along the y-axis of the tines will be determined by a number of factors. Among other things, the dimensions and location must be such that the attachment means 120 inhibits motion in the x-direction toward and away from each other, but does not interfere with the desired flexing of the "attached" tines in directions other than the x-axis.

In the preferred embodiment, the connecting means 120 is provided as a thin rectangular strip of piezoelectric material oriented along the x-axis, that is sufficiently thick in the direction of the z-axis and y-axis to prevent the aforementioned vibration of the tines with respect to each other along the x-axis. As indicated above, however, the strip is preferably sufficiently small along the y- and z-axes so that it does not otherwise interfere with the desired flexure and/or signalling functions of the sensor.

Those skilled in the art will also understand that a broad range of alternative connecting means 120 other than the above-described etched piezoelectric bridge member 122 may be utilized without departing from the scope of my invention. These include, by way of example and not be way of limitation, the use of ceramic, metallic, or other material different from that of the tuning fork structure. Such connecting means would, of course, be bonded or otherwise operatively connected to the relevant tines.

Thus, the tuning forks 111 and 113 of my invention each have a pair of tines (110 and 112, and 114 and 116, respectively) and a base portion 115, with their base portions preferably interconnected to each other. The "sensing" fork 113 also includes connecting means 120 between its tines 114 and 116.

A preferred method of using my invention includes the steps of vibrating the first pair of piezoelectric tines 110 and 112 at a first frequency, and preventing the second pair of tines 114 and 116 (which are parallel to and interconnected with the first pair of tines) from vibrating directly toward or away from each other. During certain rotations of the assembly, vibrations and corresponding piezoelectric voltages are induced in the second pair of tines 114 and 116 which are then sensed to determine the angular rate of rotation.

Thus, by my invention, I provide a relatively simple and inexpensive construction of an improved angular rate-sensing device.

The sensor and method of my invention have been described with some particularity but the specific designs, constructions and methods disclosed are not to be taken as delimiting of the invention in that various modifications will at once make themselves apparent to those of ordinary skill in the art, all of which will not depart from the essence of the invention and all such changes and modifications are intended to be encompassed within the appended claims.

I claim:

1. In a rotation rate sensor of the type that includes a generally planar and H-shaped sensor frame of piezoelectric material, said frame including a first pair of tines and a second pair of tines collectively forming legs of said H-shape, each of said first and second pairs of tines being joined to an intermediate cross-piece, the first pair of tines, the second pair of tines, and the intermediate cross-piece defining a planar configuration, the frame further including a first array of drive electrodes fixed to said first pair of tines for transmitting electrical signals for driving said first pair of tines in-plane, and a second array of pickoff electrodes fixed to said second pair of tines for transmitting electrical signals generated in said second pair of tines in response to Coriolis-induced out-of-plane bending thereof, the improvement comprising:

connecting means for connecting each tine of the second pair of tines to the other tine of said second pair of tines at a location spaced from said intermediate cross-piece, toward the tine ends of the second pair of tines.

2. The sensor of claim 1, wherein said connecting means comprises a connecting member of piezoelectric material that is generally parallel to said intermediate cross-piece.

3. The sensor of claim 1 or claim 2, wherein said connecting means is disposed between said second pair of tines to prevent each tine of said second pair of tines from vibrating directly toward and away from each other.

4. A method of sensing rotation, including the steps of:

vibrating a first pair of piezoelectric tines at a first frequency;

coupling a second pair of tines to the first pair of tines, the second pair of tines being parallel to and interconnected with said first pair of tines;

connecting the tines of the second pair of tines to each other to prevent vibration of each tine of the second pair of tines toward and away from each other; and sensing piezoelectric voltages in said second pair of tines, said voltages in said second pair of tines being induced by the vibration of said second pair of tines, which vibration is in turn caused by the vibration of said first pair of tines and the rotation of said first and second pairs of interconnected tines.

5. A sensor comprising:

a generally planar and H-shaped sensor frame of piezoelectric material, said frame including a first pair of tines and a second pair of tines, the first and second pairs of tines joined by an intermediate cross-piece;

connecting means for connecting each tine of the second pair of tines to the other tine of the second pair of tines at a location spaced away from said intermediate cross-piece, toward the tine ends of the second pair of tines, wherein said connecting means is disposed between the second pair of tines to prevent each tine of the second pair of tines from vibrating directly toward and away from each other.

6. A rotation rate sensor including a first pair of tines and a second pair of tines, the pairs of tines being joined by an intermediate cross-piece, the pairs of tines and the cross-piece being of piezoelectric material, and further including connecting means for connecting each tine of the second pair of tines to the other tine of the second pair at a location spaced apart from said intermediate cross-piece, wherein the connecting means is disposed between each tine of the second pair of tines to prevent the tines from vibrating toward and away from each other.

7. The sensor of claim 6, wherein said connecting means comprises a connecting member of piezoelectric material that is generally parallel to the intermediate cross-piece.

8. An angular rate sensor, including:
 a dual tuning fork structure of piezoelectric material, each of the tuning forks having a pair of tines and a base portion, the dual tuning forks being interconnected at said base portions;
 an attachment member for attaching one tine of one of the pairs of tines to the other tine of the pair at a location remote from the interconnected base portions,
 wherein the attachment member is substantially parallel to the interconnected base portions, and the tuning forks are disposed in oppositely extending directions from said interconnected base portions along a first axis,
 further wherein the tines of each pair of tines are spaced relatively to each other along a second axis perpendicular to the first axis, such that the attachment member prevents the two attached tines of the pair of tines from moving relative to each other along the second axis.

* * * * *